United States Patent [19]

Kikinis

[11] Patent Number: 5,727,159
[45] Date of Patent: Mar. 10, 1998

[54] SYSTEM IN WHICH A PROXY-SERVER TRANSLATES INFORMATION RECEIVED FROM THE INTERNET INTO A FORM/FORMAT READILY USABLE BY LOW POWER PORTABLE COMPUTERS

[76] Inventor: Dan Kikinis, 20264 Ljepava Dr., Saratoga, Calif. 95070

[21] Appl. No.: 629,475

[22] Filed: Apr. 10, 1996

[51] Int. Cl.$^6$ .................................................. G06F 5/01
[52] U.S. Cl. .................................................. 395/200.76
[58] Field of Search .................. 395/200.68, 200.75, 395/200.76, 200.77; 370/401–409

[56] References Cited

U.S. PATENT DOCUMENTS

| | | | |
|---|---|---|---|
| H1641 | 4/1997 | Sharman | 370/338 |
| 5,159,592 | 10/1992 | Perkins | 370/338 |
| 5,325,362 | 6/1994 | Aziz | 370/312 |
| 5,564,070 | 10/1996 | Want et al. | 455/507 |
| 5,572,528 | 11/1996 | Shuen | 370/402 |
| 5,627,829 | 5/1997 | Gleeson et al. | 370/230 |
| 5,636,217 | 6/1997 | Moelard | 370/338 |

OTHER PUBLICATIONS

W. Simpson, IPng Mobility Cosiderations, Network Working Group, Request for Comments 1688, Aug. 1994.

Perkins, Charles E., *Simplified routing for mobile computers using TCP/IP*, IEEE, 1992.

Chikarmane et al., *Mobile IP-based Multicast as a service for Mobile Hosts*, IEEE, 1995.

Qu et al, *A Practical Method for Achieving Portable Communications in the Internet Context*, IEEE, 1995.

*Primary Examiner*—Richard L. Ellis
*Attorney, Agent, or Firm*—Donald R. Boys

[57] ABSTRACT

A system is provided wherein relatively low-end computers, such as portable, battery-powered computers ordinarily incapable of Internet browsing functions may be used to browse the Internet. The enhanced computing ability for such portables is provided by a unique arrangement having a Proxy-Server with adequate computing power for all World Wide Web (WWW) browsing and downloading functions, and further capable of transposing downloaded files to alternative, low-information-density form suitable for rapid processing and display by connected portable and other low-end computers. In some embodiments the data link from the connected low-end units is a TCP/IP pipe, supporting TCP/IP protocol, but not the many sophisticated extensions usually associated with TCP/IP. In embodiments wherein battery-powered units are used, connected to the Proxy-Server, battery life is exhibited far beyond what would be expected for a battery-powered computer with computing power for browsing the Internet directly.

17 Claims, 6 Drawing Sheets

SYSTEM IN WHICH A PROXY-SERVER TRANSLATES INFORMATION RECEIVED FROM THE INTERNET INTO A FORM/ FORMAT READILY USABLE BY LOW POWER PORTABLE COMPUTERS

FIELD OF THE INVENTION

The present invention is in the area of apparatus and methods including software for accessing information from the Internet, and providing the accessed information to an end user. The invention has, in various embodiments, particular applicability to portable computers powered by batteries and the like used as field units for Internet access.

BACKGROUND OF THE INVENTION

There are many motivations to computer development, depending largely on targeted customer groups. For example, a certified public accountant needs to run applications having to do with accounting, taxes, financial planning, and the like, while a fiction writer may wish only to use a computer as a word processor. The kind of system one of these people might choose to own may be vastly different from the type the other would purchase. Manufacturers plan their research and development to produce products that appeal to their targeted customer bases.

Even with the considerable differences in needs between different consumer groups, there are still many commonly desirable traits in computer development. For example, regardless of the ultimate functionality of a particular sort of computer, a low cost to manufacture is a desirable characteristic. Another desirable characteristic is portability. There are advantages to being able to easily move one's computing tool from place to place, and even greater advantages to having a portable computer small enough to carry in a pocket or purse.

Even though portability and small size is generally desirable, power and functionality are always desirable as well, and these characteristics are competitive. Conventionally and historically one pays a penalty for small size and portability.

One of the penalties typically paid is functionality as related to battery life. That is, if one uses a powerful and fast CPU in a portable computer, the size of the battery must be quite large, and life between charges will be relatively short. For example, it can be shown in general that 100 grams of battery weight, fully charged, will power about $5 \times 10^8$ instructions. It is to be understood that this is a general figure, and may vary somewhat for different CPUs, types of batteries, and the like.

Given the figure above relating battery weight to a number of instructions for illustrative purposes, if a portable computer is to be provided with ability to execute relatively high-overhead applications, such a HTML files in Internet applications, the CPU for the portable computer will have to operate at 1 to 2 MIPS (million instructions per second). Assuming 1 MIPS, a battery weight of 100 g. will discharge in about 8 minutes. A five hundred gram (a little over one pound) battery will provide a life between charges of about 41 minutes.

It is seen, then, that as applications and desired functions for personal computers become more sophisticated, it becomes ever more difficult to provide theses applications and functions for small, personal, battery-powered computers.

There are some ways that battery life may be extended or optimized. For example, power-management techniques may extend battery life by 1.5, use of low-power integrated circuit technology can add another 1.5, sophisticated electrical storage technology another 1.5, and solar recharge perhaps another 1.2. The net multiplier, using every means of help is about 5, so a 500 g battery will then power such a computer for about three hours. Five hours is still a relatively short battery lifetime, so sophisticated operations for small, portable computers, such as World Wide Web (WWW) browsing on the Internet, are not, until the time of the present invention, very practical.

Further to the above discussion, as the global network of connected databases known as the World Wide Web continues to grow, social and political concerns grow as well. Many are concerned that the expense and complexity of end-use computers suitable for WEB browsing is a formidable barrier to increased information access by disadvantaged millions, for which WEB access may be seen as a tool for empowerment and social and political advancement.

What is clearly needed is apparatus and methods whereby sophisticated operations like Web browsing and the like may be accomplished with small, battery-powered portable computers, such as hand-held computers, while also accomplishing a life-between-charges of a week or more, without requiring especially heavy batteries.

SUMMARY OF THE INVENTION

In a preferred embodiment of the invention a computing system is provided comprising a field computer comprising a display having a specific size and resolution; and a Proxy-Server connected to the field computer by a data link, the Proxy-Server having an Internet port. The Proxy-Server is adapted in this preferred embodiment to access Internet servers through the Internet port directed by commands and data received from the field computer, to download data from the Internet servers thus accessed, to transpose the downloaded data by reducing information density, and to transfer the transposed data to the field computer via the data link in a Transfer Control Protocol/Internet Protocol (TCP/IP) format.

A particular advantage in embodiments of the invention accrues in use of portable computers powered by electrical storage cell systems, such as by batteries of various sorts. In these embodiments functionality to battery life is significantly extended. Hand-held computers with computing power lower than one-hundred thousand instructions per second can be apparently fully functional Internet browsing tools, while enjoying battery life between charges of as much as two weeks, or more.

In various embodiments of the invention the Proxy-Server downloads data comprising WEB pages and transposes the data to match the specific size and resolution of the display of the field computer. The Proxy-Server may also accomplish caching functions in handling data from the Internet to a field computer coupled to the Proxy-Server.

Also in some preferred embodiments of the invention, when a field computer makes a data link with a Proxy-Server adapted according to embodiments of the invention, the field computer transfers to the Proxy-Server information particular to specific characteristics of the field computer, such as the size and resolution of the display of the field computer. The Proxy-Server then uses this information in transposing data for transfer to the field computer.

Various data links known in the art may be used for coupling field computers, such as battery-powered portable units, to a Proxy-Server according to embodiments of the invention. Among these links are telephone modems, both analog and digital, and cordless connections of various types.

Elements of the invention in various aspects can be provided separately to be generally compatible in operation. For example, Proxy-Servers adapted to perform the browsing and data transposing functions of embodiments of the invention, and adapted to transmit transposed files to connected field computers can be provided without adapted field computers. Moreover, field computers can be provided for end-users adapted for operation with Proxy-Servers, but may be provided separate from Proxy-Servers. Many existing computers, including those types generally known as personal organizers, digital assistants, and the like, may be adapted to cooperate with Proxy-Servers according to embodiments of the invention.

Further to the above, various items of software can also be provided according to and compatible with hardware devices and systems independently of the hardware devices and systems.

In practicing the invention, one's adapted personal computer is coupled to a Proxy-Server over a data link such as a telephone modem, and may, according to an aspect of the invention, transfer specific information, such as the type, size, and resolution of the personal computer's display, to the Proxy-Server. The Proxy-Server may then browse the World Wide Web according to instructions received from the personal computer, transpose files downloaded from the Web into a form quickly and easily usable by the personal computer, and transmit the transposed data to the personal computer for display. Very large files may become fewer files, and much smaller files in the transposition.

There are many benefits to be expected from practicing various embodiments of this invention. For example, low-end, hand-held computers, including such units known generally as personal organizers and personal digital assistants (PDAs), now become fully-functional Web browsers. This effect alone extends the use of the Web dramatically to people and institutions that might otherwise be excluded from the exponentially growing body of human knowledge available. The benefits extend to schoolrooms as well as to the homes of potential users. Accessibility is also significantly advanced for cultures and countries where such technology might not be available soon, or ever. There are many such social and cultural benefits. In addition, there are the clear benefits of power-saving, produced by the very efficient use of computing power at the Proxy-Servers of the invention, rather than at the computers in the field.

In addition, combination designs of televisions and computers, which are just being offered at the time of this patent application, could benefit from incorporation of features of this invention, wherein much of the computing load could be carried by a Proxy-Server, allowing simplicity and lower-end CPUs to be used at the TV apparatus. In alternative embodiments, computing power no longer needed could be used for other tasks, such as providing a soft-modem. Reduced file size in such applications will also provide faster loading, which will be important for some time to come, because analog phone lines will continue to be the principle carriers in the near future.

BRIEF DESCRIPTION OF THE DRAWINGS

FIG. 4 is a second part of the exemplary session script for which FIG. 3 is a first part.

DESCRIPTION OF THE PREFERRED EMBODIMENTS

Figure 1:
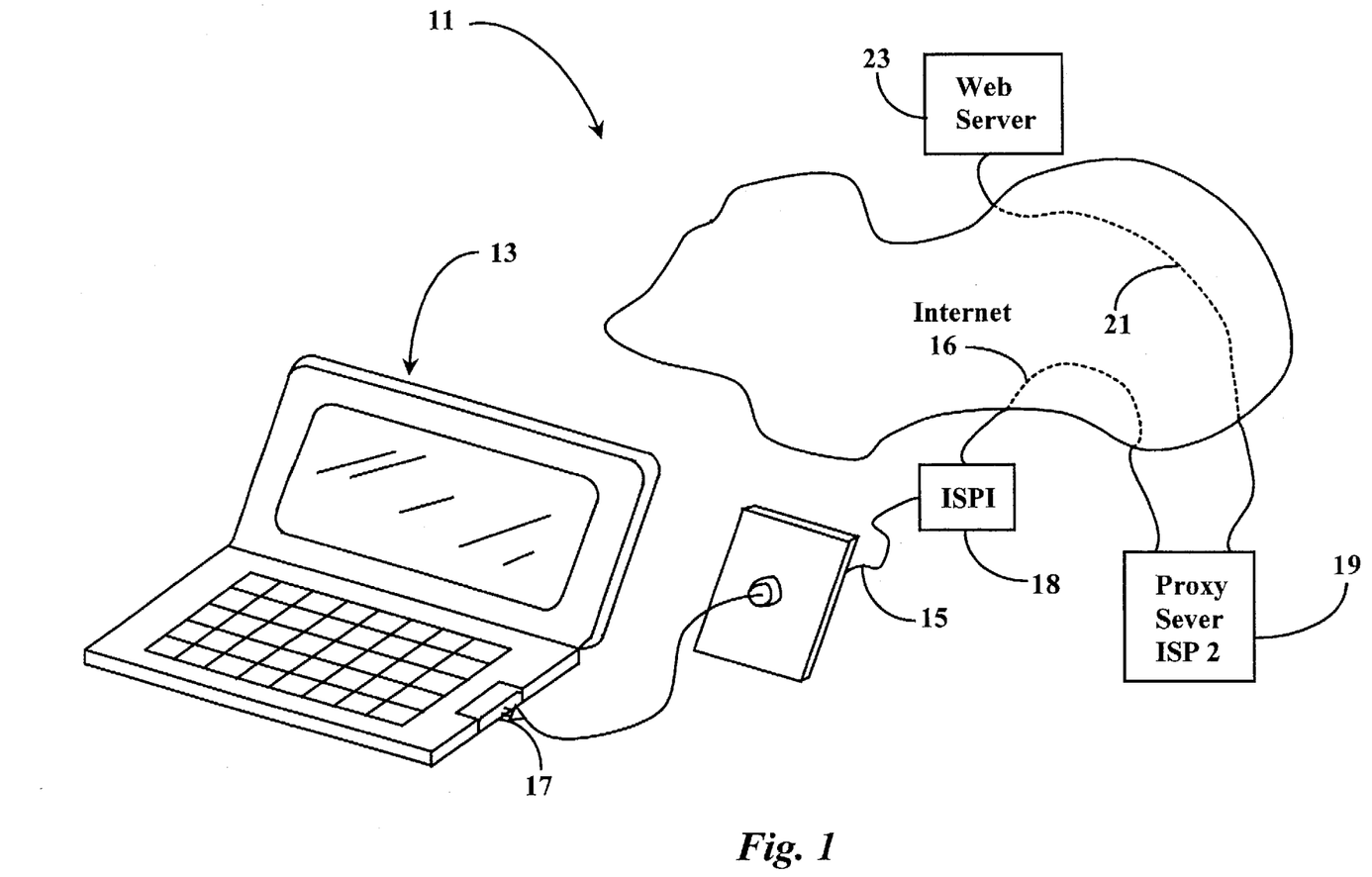
FIG. 1 is a largely diagrammatical illustration of a Proxy-Server system according to an embodiment of the present invention.

FIG. 1 is a largely diagrammatical illustration of a computing system 11 according to an embodiment of the present invention. In this embodiment a hand-held computer 13 is connected via a telephone line 15 through a modem 17 to a first dial-up point 18, which may be an Internet Service Provider. Accordingly, dial-up point 18 is labeled ISP 1. In this arrangement a Proxy-Server 19 according to an embodiment of the present invention is established as a server on the Internet, and a command from unit 13 to ISP 1 results in connection through a TCP/IP pipe 16 to Proxy-Server 19. Proxy-Server 19 is also labeled ISP 2, for Internet Provider 2. Proxy-Server 19 has links to other Web servers on the Internet as is known in the art, and may open TCP/IP paths 21 to any such Web server.

In alternative arrangements, connection may be by modem from unit 13 directly to Proxy-Server 19. Alternatively, Proxy-Server 19 may be a node on a LAN at a corporate system. In all cases of embodiments of the invention, communication from unit 13 to Web Servers on the Internet is through Proxy-Server 19.

In this embodiment hand-held computer 13 is a high-end personal organizer, such as a Sharp Wizard™ personal organizer. The hand-held computer, however, can be any one of a large number of commercially available computing devices with a broad range of capabilities, including those devices known as personal digital assistants (PDAs). In other embodiments and aspects of the present invention, the computer used by a person to access and interact with the Proxy-Server in practicing the present invention need not be a hand-held, or even a portable computer in the sense the terms are used in the art. In some aspects, capabilities of a field unit according to the present invention are built into a set-top box for a TV system or directly into a TV set.

Most computers capable of modem communication can serve to practice the invention, and, in the following discussion, the terms field computer or field unit are used to generally indicate a computer used anywhere for primary Internet access, whether through and in cooperation with a Proxy-Server according to an embodiment of the present invention, or not.

Even though the present invention is not limited to hand-held, battery-powered computers, but is applicable to personal computers of all types, the techniques of the invention are particularly advantageous when used with portable, battery powered devices as filed units, because they provide a way to accomplish relatively sophisticated computer operations with low-end, low-power CPUs. This technique is particularly effective in saving power relative to functionality, which provides greatly extended battery life.

Returning to FIG. 1, in this arrangement, computer 13 has a modem 17, and is connected via phone lines 15 to a Proxy-Server 19, as described above, such as through a first dial-up point. This connection is convenient, but not required. There are a number of other ways computer 13 may be connected to the Internet, or to a similar Proxy-Server without telephone lines, such as by a satellite link or cable modem, or by a combination of data links. Also, the modem shown may be a built-in modem or an external modem, and may also be either an analog modem or a digital link such as an Integrated Services Digital Network (ISDN) modem.

Proxy-Server 19 in this arrangement is unique. In a conventional system, proxy-servers, if used at all, are used only for caching and security. In embodiments of the present invention the Proxy-Server performs much of the computing that computer 13 would otherwise be obliged to perform. Proxy-Server 19 and its functionality with computer 13 is described in more detail below.

Figure 2:
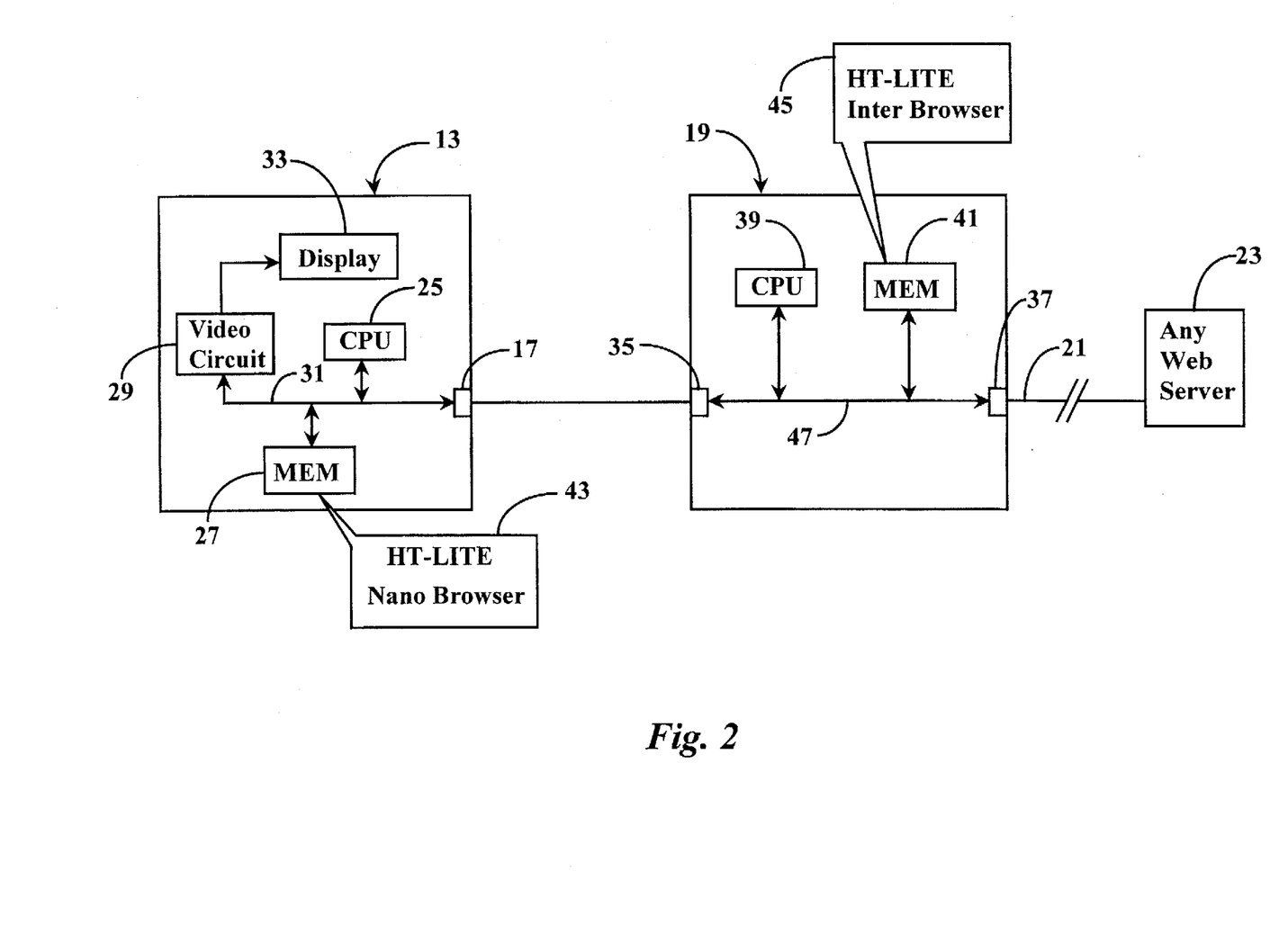
FIG. 2 is a diagram of a portable computer and a Proxy-Server from FIG. 1, showing additional detail.

FIG. 2 is a diagrammatical illustration of hand-held computer 13, Proxy-Server 19, and WEB server 23 from FIG. 1 showing additional detail. In FIG. 2, computer 13 is shown connected directly to Proxy-Server 19, but could be connected by a number of ways, as is described more generally above.

Computer 13 has a CPU 25, a memory 27, video adapter circuitry 29, and modem 17 all communicating on bus 31. Video circuitry 29 drives a display 33. Memory 27 may be any of a number of types, such as flash, random access (RAM), read-only (ROM) or similar type, or a combination of these. There may be other components as well, but these are not shown to facilitate description of the unique aspects of this embodiment of the invention. The hardware arrangement is intentionally shown as general, and is meant to represent a broad variety of architectures, which depend on the particular computing device used.

Proxy-Server 19 is a relatively sophisticated and powerful computer typical of computers used as WEB servers, although the use in this embodiment of Proxy-Server 19 is not the conventional or typical functions of a WEB server as known in the art. Proxy-Server 19 has a CPU 39, a memory 41 and a means of connecting to a network. The network connecting means in this embodiment is a modem 35 communicating on a bus 47. In other embodiments the network connecting means may be a network adapter or other.

Modem 35 in the embodiment shown is compatible with modem 17 in computer 13. In other embodiments link 15 may be of a different sort, and connection may be made through a dial-up point as shown in FIG. 1. A communication port 37 connects to communication link 21 (FIG. 1), providing communication with conventional WEB server 23, which represent any WEB server that may be accessed on the World Wide Web.

Port 37 and link 21 may be any of several types. In some embodiments, server 23 and server 19 will be nodes on a local area network (LAN), and the link between the two servers will be a serial network link with port 37 being a LAN card according to any of a number of well-known protocols. In other embodiments link 21 may be another telephone line, and port 37 will be a telephone modem. In still other embodiments, this link could be a parallel communication link.

Proxy-Server 19 exists in this embodiment of the invention to perform functions enabling hand-held computer 13 to operate as an apparently powerful web-browsing machine, even though the stand-alone capability of computer 13 will not even begin to support such functionality. As is well-known in the art, for a computer to be a fully-functional web-browsing system requires a high-performance CPU and execution of relatively sophisticated web-browsing and display applications. Such a computer typically has to operate, as described above, at or above a million instructions per second.

In the embodiment of the present invention shown by FIGS. 1 and 2 Proxy-Server 19 executes a program 45 the inventor terms an InterBrowser. The InterBrowser combines functionality of a conventional web browser with special functions for recognition of and communication with hand-held computer 13. Commands from computer 13, such as, for example, a command to access a WEB page on the World Wide Web, are received by Proxy-Server 19 operating the InterBrowser program, and acted upon as though they are commands received from a conventional input device such as a keyboard.

Following the example of a command communicated over link 15 from computer 13 for accessing a WEB page (typically a Universal Resource Locator (URL), Proxy-Server 19 accesses the appropriate server (in this case server 23) over link 21, and downloads the appropriate data over link 21. Proxy-Server 19 therefore has HTML and TCP/IP capability, and typically has access to and capability of executing a host of other routines as known in the art for supporting WEB browsing and accessing data through the World Wide Web. These routines and this functionality are all very well-known to those with skill in the art.

Proxy-Server 19, instead of displaying the downloaded data (or playing video and/or audio output, as the case may be, depending on the downloaded data), translates the data to a simpler communication protocol and sends the data to computer 13 for output over link 15 in a TCP/IP protocol. Link 15 becomes a dedicated TCP/IP pipe to and from Proxy-Server 19. Proxy-Server 19 thus acts as a proxy for computer 13, performing those functions of WEB browsing computer 13 cannot perform.

Computer 13 through execution of a program the inventor terms a NanoBrowser 43 sends commands entered at computer 13 over link 15 to Proxy-Server 19 and accepts data from Proxy-Server 19 to be displayed on display 33. Data is transferred in a protocol the inventor terms HT-Lite. The NanoBrowser also provides for interactive selection of links and entry into fields in displays, as is typical for WEB pages displayed on a computer screen. The NanoBrowser provides for accepting such entry, packaging data packets in TCP/IP form, and forwarding such data to Proxy-Server 19, where much greater computer power provides for efficient processing.

In conventional WEB browsing, all final processing takes place at the browser's computer, and those who establish WEB servers assume that browser's will operate with sufficiently powerful equipment and programs to accomplish all of the necessary processing. No such processing is done at the WEB servers.

One of the processing tasks that has to conventionally occur at the browser's computer is processing of received data into a format to be displayed on whatever display the user has. There are, as is well-known in the art, many types of displays and many display modes. These range all the way from relatively crude LCD displays to high-resolution, multi-color displays. There are, in addition, a number of other functions that have to be performed conventionally at a user's computer to interact effectively with the WWW. For example, audio and video and some other functions typically require supplemental, or helper, applications to be installed on or downloaded to a field unit to process audio and video data and the like.

Most data transferred by WEB servers assumes relatively high-end displays, such as color SVGA displays as known in the art. In PDAs and digital organizers, such as those anticipated for use in the present invention, the displays are relatively low resolution, and are typically LCD in nature. In the system described with the aid of FIGS. 1 and 2 Inter-Browser program 45 at the Proxy-Server and the HT-Lite NanoBrowser program at the hand-held unit cooperate in another manner as well. When one connects to the Proxy-Server the hand-held unit, through the HT-Lite Nano-Browser program, provides a signature which the Proxy-Server compares with logged signatures.

An ID match when connecting a hand-held unit to the Proxy-Server provides the Proxy-Server with information about the hand-held unit, such as CPU type and power, screen size, type and resolution, presence of a pointer device, and sound capability. The Proxy-Server then uses this specific information to translate HTML and other files from the Internet to a form readily usable without extensive additional processing by the hand-held unit. For a small monochrome LCD display a 60 k/70 k JPEG file becomes a 2 k/4 k bit map, for example. Also, multi-file pages are recombined into single file pages. This translation also minimizes bandwidth requirement for link 15, and speeds transmission of data.

It is in this ability of the Proxy-Server to do the heavy computing, of which the translation of HTML files is a single example, that is responsible for a unique ability of hand-held devices in practicing embodiments of the present invention to accomplish functions that they could not otherwise accomplish, and to do so without inordinate usage of stored energy. In various embodiments of the present invention, hand-held devices with CPUs having an ability to run at from 0.001 to 0.05 MIPs can serve as WEB browsers, displaying WEB pages and allowing users to initiate on-screen links and to input data into input fields. Given the above example of MIPs requirement for WEB browsing, where currently available solutions may provide a 5X advantage, practicing the present invention can provide an advantage of up to 2000X, resulting in battery life approaching 2 weeks (given a 100 g battery weight), where expected battery life for similar functionality with a powerful CPU was calculated as 8 minutes.

There are many functions other than simple WEB browsing that are desirable for a hand-held devices like those contemplated to be used with systems according to embodiments of the present invention. The typical functions for digital organizers and PDAs, for example, such as scheduling of appointments, listing phone numbers, addresses and the like, taking notes, sending faxes and E-mail and so forth, and such tasks as currency conversion, are still provided by a hand-held unit executing HT-Lite. Now, however, these functions are more interactive than previously, as data for these functions can be exchanged through the TCP/IP link with the Proxy-Server, which may access data from a variety of sources to update data for such functions.

In a preferred embodiment of the present invention a variety of Groupware functions are supported, wherein a database having variable data such as appointment schedules for employees may be accessed from several different points, such as from a computer at home, a computer on a network at the office, and a hand-held computer in the field, through a Proxy-Server connection. In such interactive circumstances, date and time monitoring may be used so files in different locations may be updated when connection is made between units having different versions of a file. Also, access may be provided selectively, so, if preferred, only certain persons may have access to certain files. For example, one user could grant another access to his or her appointment schedule, such that one could make an appointment for oneself on another's appointment schedule.

To practice the invention, given an accessible WEB server configured as a Proxy-Server according to an embodiment of the present invention, one needs only to load HT-Lite NanoBrowser software on a computer and to provide Internet access for the computer, such as by a telephone modem. In many cases, candidate computers have built-in modems. In other cases, an external modem may be provided and connected. In the case of hand-held devices, such as PDAs and organizers, some have an ability to load software via a serial port, a PC card slot, through the modem extant or provided, or by other conventional means. IN some cases, all operating code is embedded, that is, recorded in read-only memory. In some of these cases, adding HT-Lite routines may require a hardware replacement. In virtually all cases of hand-held devices, however, the necessary routines can be provided.

One of the components of the HT-Lite NanoBrowser software is a minimum browser routine termed by the inventor a NanoBrowser. The NanoBrowser is capable of exerting a URL over the modem connection to access the Proxy-Server. Theoretically, one could exert a URL of a WEB site other than the Proxy-Server, but the result would be an unusable connection, as the small hand-held unit would not be able to handle the sophisticated data provided to be downloaded.

Connection to the Proxy-Server provides the Proxy-Server with information as to the subscriber and the subscriber's equipment. These operations proceed in a manner well-known in the art for such log-on and security transactions. Once access is extended to the user, an interface is provided for the user to browse in a manner very similar to well-known WEB interfaces. That is, the user's display provides an entry field for a URL which is asserted by an enter key or the like. There may also be an address book for often-visited sites, as is common with more powerful machines.

Developers are quickly introducing new and useful features for WEB browsing, such as an ability for users to access electronic documents through access to their own WEB pages, machine-independently. All such features will be available in the practice of the present invention, as there is nothing in the invention that inherently restricts use more than the use of more powerful machines.

Similarly, there are no strict requirements for the location of the Proxy-Server or of accessible WEB servers in embodiments of the present invention. No restrictions are placed on such locations beyond restrictions on servers in general. In one embodiment, a corporation with multiple and perhaps international locations may have a local area network with one or more Proxy-Servers, and employees, particularly those employees whose job functions require travel, are provided with hand-held digital assistants according to an embodiment of the present invention. Multiple functions are then provided over Internet connection in Internet protocol, far beyond what could otherwise be provided with small and inexpensive units; and battery life would be far beyond what would otherwise be expected.

Figure 3:
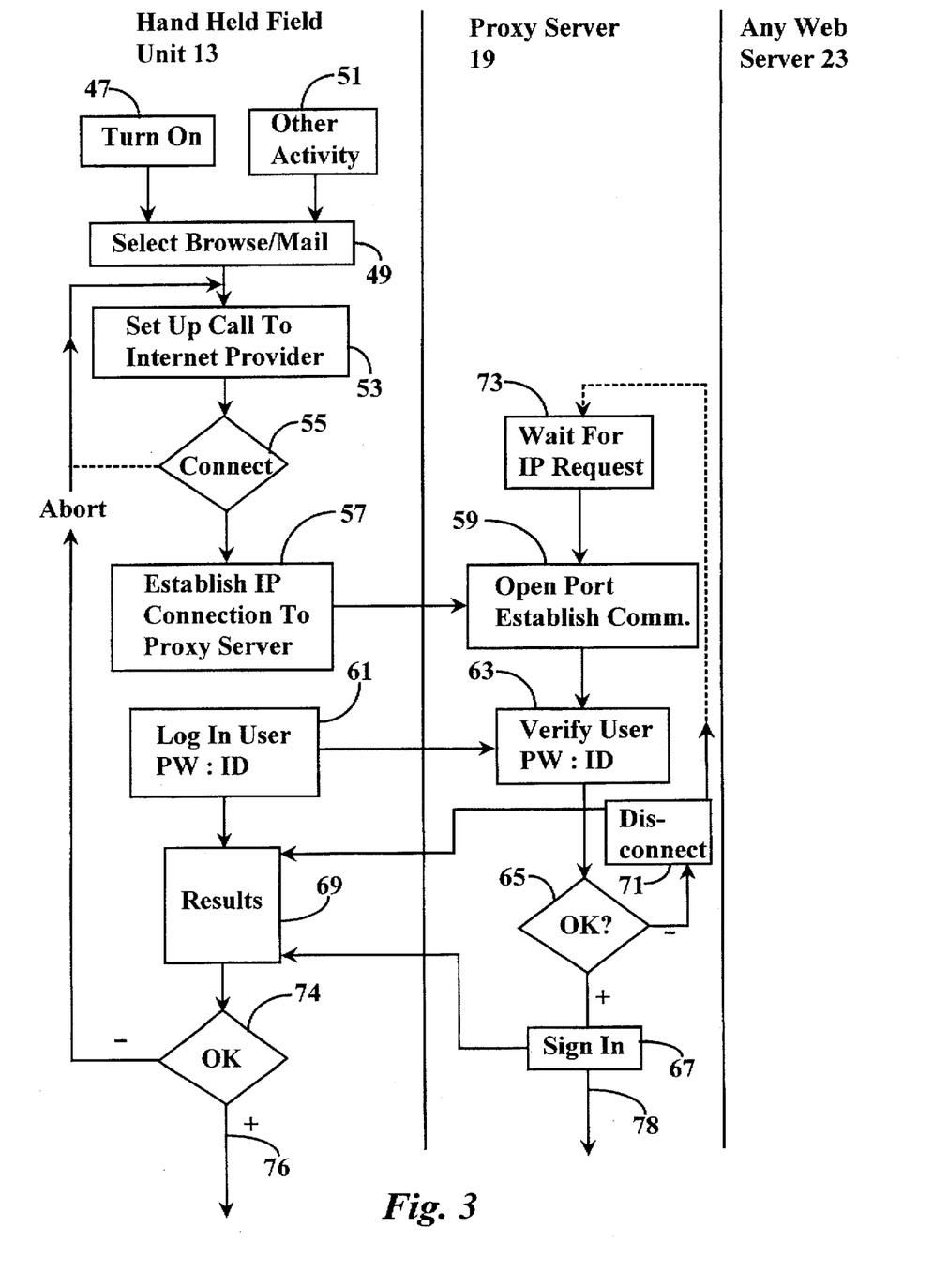
FIG. 3 is a diagram showing a first part of an exemplary session script between a hand-held computer, a Proxy-Server, and a WEB server according to an embodiment of the present invention.
Figure 4:
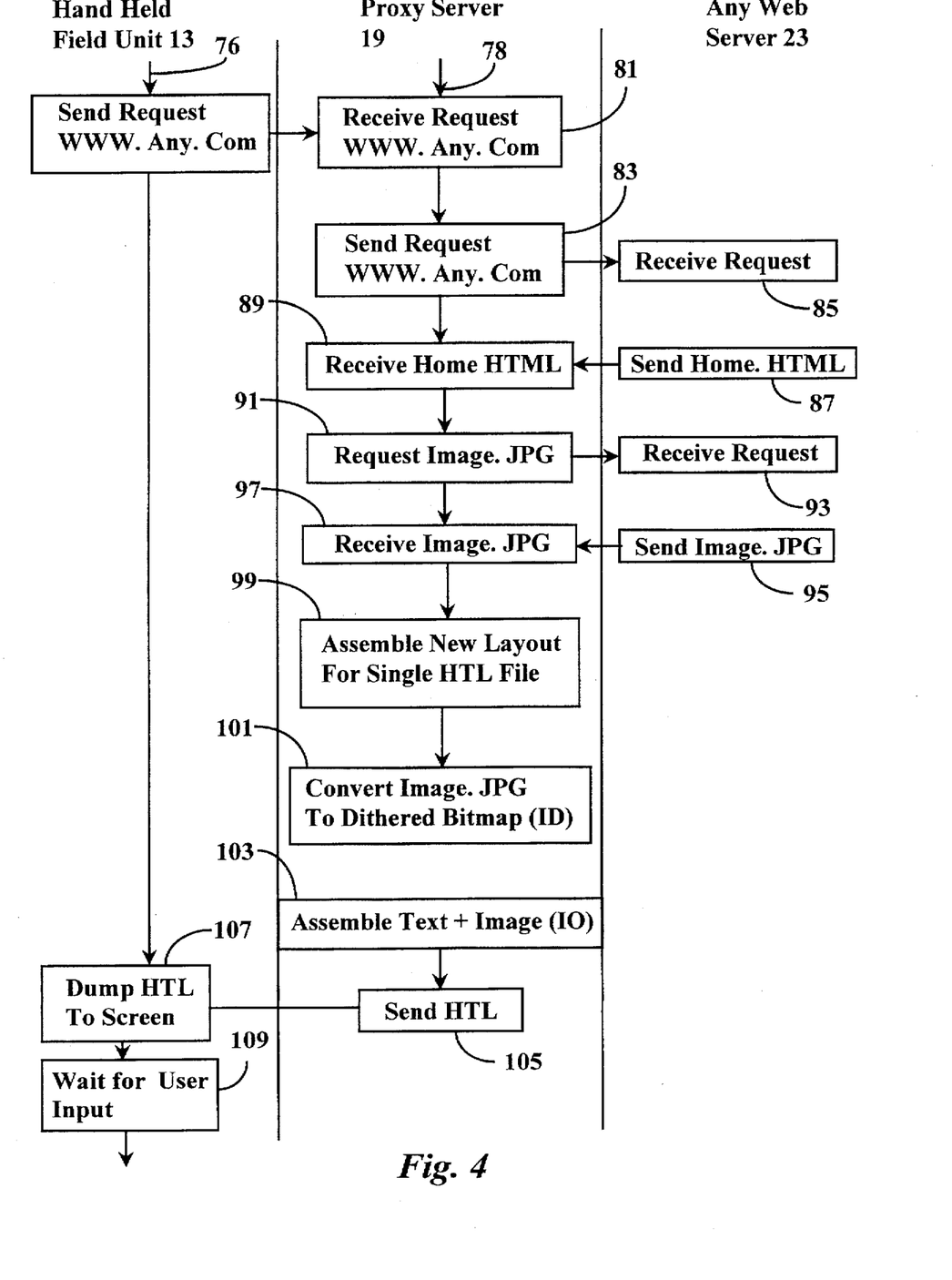

FIGS. 3 and 4 together form an example of a session script between hand-held computer 13, Proxy-Server 19, and any WEB server 23. These figures are used herein to describe important functions of the NanoBrowser incorporated in computer unit 13, and the InterBrowser, incorporated in Proxy-Server 19, as well as to illustrate methods in practicing the present invention.

Referring first to FIG. 3, the figure is divided generally into three columns (as is FIG. 4), one for functions performed at computer field unit 13, a middle column for functions performed at Proxy-Server 19, and a third column for functions performed at WEB server 23.

At step 47 a user turns on the hand-held computer. It is assumed at this point that a data link is established between the hand-held and Proxy-Server 19, which is represented in FIG. 3 and in FIG. 4 by the boundary between the left column and the center column. As previously described, this interface can be of any convenient sort, such as an analog telephone modem. After the hand-held performs a simple boot-up process, a menu is presented to the user. One of the selections (by virtue of the NanoBrowser software) is Browse/Mail.

At step 49 the user selects Browse/Mail. Other functions of the hand-held, that may be fully supported without connection to a Proxy-Server, such as appointment scheduling and phone lists, are not represented here, except by the general step 51 labeled "Other Activity". There may be other menu selections, and the Browse/Mail selection is exemplary. Initiation of communication with the Proxy-Server could be accomplished in other ways.

Routines in the NanoBrowser respond to the Browse/Mail selection by presenting the necessary interface for the user to access his/her subscribed Internet provider. At step 53 this interface is presented and the user makes the necessary inputs to establish the provider connection.

The present example assumes connection and operation through an Internet provider, wherein the subscriber's status is that of a Proxy-Server subscriber, although this is not the only arrangement within the scope of the invention. Employees of a corporation might, for example, log on to a server on a company network.

Connection to the Internet provider is made at step 55. At step 57 action is taken to establish an Internet Protocol (IP) connection to a Proxy-Server according to the present invention. Initial communication from the connected hand-held causes the Proxy-Server to open a port and establish the connection at step 59.

At step 61 the user logs on by entering a user name and password and the field unit identifies itself with its ID. At step 63 the Proxy-Server compares the entered password and ID with stored records, and derives a signature for the unit. At step 65 the Proxy-Server decides whether the information is correct. If the Log-On is valid, control passes to step 67, and the Proxy-Server acknowledges the successful log-on to the hand-held unit at step 69. If the log-on is not valid, control in the Proxy-Server goes from step 65 to step 71, and the Proxy-Server disconnects from the hand-held unit. The Proxy-Server then waits for a new ID request (step 73).

At the hand-held unit, assuming an unsuccessful log-on, control passes from step 74 back to step 53, and the user is provided another opportunity to log on. Control continuity from the hand-held unit to further steps in FIG. 4 is indicated by line 76. For the Proxy-Server the control continuity to FIG. 4 is indicated by line 78.

Referring now to FIG. 4, which is a continuation of FIG. 3, continuity lines 76 and 78 are shown at the top of the figure. Following the activity at the hand-held, at step 79 a request is sent from the hand-held (after having been entered by the user) to access a page on the WWW. This request is represented by the URL WWW.Any.Com, which can be any valid Universal Resource Locator (URL) for the Internet.

At step 81 the Proxy-Server receives this request. The proxy server processes the request from the hand-held and at step 83 issues a new request through its own full-service browser, through its connection to the Internet, to access WWW.Any.Com. At step 85 the WWW server at WWW.Any.Com receives the request from the Proxy-Server and at step 87 sends its home page HTML file, represented as Home.HTML, to the Proxy-Server.

At step 89 the Proxy-Server receives Home.HTML. Home pages typically contain at least one image file, which in many cases is a JPG file. Accordingly, at least two files must be downloaded to display a home page. At step 91 a request for a JPG image file is sent by the Proxy-Sever. The Proxy-Server receives this request at step 93 and send the image file to the Proxy-Server at step 95. The Proxy-Server receives the image file at step 97. There may be many more files than this, but a minimum representation has been made for simplicity in description.

At step 101 the Proxy-Server converts all of the .jpg files to a dithered bitmap format according to information associated with the user ID received from the hand-held at log-on. This ID establishes the size and resolution of the hand-held's display, for example, and the bitmap created from the .jpg files is scaled to the hand-held's display.

Once all the files in the Home page script are downloaded from the accesses Web server at WWW.Any.Com, the Proxy-Server assembles all of these files into a single HT-Lite (HTL) file for transfer to the hand-held. This process is represented by step 103. At step 105 the new HTL file is transmitted to the hand-held unit. The hand-held receives at step 107 the single HTL file prepared from the several HTML files received by the Proxy-Server. Finally, at step 109 the hand-held awaits new user input, such as, for example, a request to jump to a related page.

As has been described above, field computers of many sorts may be used for connecting to the Internet through a Proxy-Server according to embodiments of the present invention, although there are particular advantages in using small, inexpensive, battery-powered, hand-held field units. As has also been described, information relating to the field unit used by each subscriber is recorded at the Proxy-Server (or available to the Proxy-Server), and, upon connection, the Proxy-Server accesses this information, and uses it in transposing files for a particular unit.

In some cases, a display used by a field unit will be large enough to display an entire page from the WWW. In other cases, it will be preferable to present just a part of an entire page, because the display of the field unit may be too small to provide an entire page with adequate resolution. In these cases it will be necessary to zoom and pan to see an entire page. In one embodiment of the invention a field unit is provided with an auxiliary small display, to present information relative to the position on a page that may be presented on the main screen, as an aid in panning to other parts of the page.

It is well-known that graphic information is not the only information accessible on the Internet. Audio may be downloaded in many cases as well. In many cases where audio is available, software, often termed a "media player" is provided to be downloaded from the same source to be used by the connecting computer in processing the audio data. The present structure of the Internet WWW is such that users are assumed to have certain kinds of equipment of sufficient computing power to do Web browsing and to operate media players. For example, media players are typically provided for IBM-compatible PC, Macintosh, or Sun systems.

In many embodiments of the present invention, wherein field units of much lesser power than the present assumptions may be used, these assumptions are no longer valid. Many field units which may now, with the unique capabilities of Proxy-Servers according to embodiments of the present invention, be used for browsing the WWW, will not be capable of executing the typical media players.

As has been described above, subscribers to a Proxy-Server system according to the present invention will provided characteristics of their particular field units to the Proxy-Server, and the Proxy-Server will use the information in transposing files. The same is true for audio, so the Proxy-Server will "know" if a particular field unit has a speaker system, and what the computing capability of the field unit is. In alternative embodiments of the present invention, field units will be provided with capability to receive Linear Predictive Coded (LPC) audio data, and to drive one or more speaker units. The Proxy-Server, in these cases, will either download the media players as necessary, or be previously programmed with media players, and will convert the audio data downloaded from the Internet to the form usable by the field units as a part of the overall transposing process.

In some aspects of the invention specialized field units are provided for special purposes. A hand-held computer is provided, for example, with a CPU, a ROM having embedded NanoBrowser software, a main display, and an auxiliary display for indicating page position for panning and the like. In some variations, a microphone and a speaker are also provided, and the on-board software includes routines for processing audio in both directions, to and from the Proxy-Server. In other variations a digital camera apparatus is provided with the hand-held unit, and a user can snap digital pictures and send the data to the Proxy-Server or to any other machine on the Internet by E-mail. In combinations of these variations very useful systems are provided for field operatives of such as insurance companies to do field work.

Other field units are provided in alternative embodiments as desk units for school environments, having many or all of the features of the hand-held units described, but taking the form of desktop units with conventional power supplies rather than batteries. Such units can be made with considerably lower complexity and cost than units conventionally capable of interacting with the Internet, providing much expanded Internet access for school systems and the like. These units incorporate NanoBrowsers according to embodiments of the present invention.

Another form of field unit according to the present invention is a TV-type unit having a low-end CPU and embedded NanoBrowser software according to an embodiment of the present invention. Home TV-computer technology may thus be provided through a Proxy-Server connection at a cost very much below currently available systems. Such units will also be attractive for use in hotels, as they expand on existing information systems using TV sets in hotel rooms.

In captured corporate systems, properly termed Intranet systems, scheduling, ordering, instructions, travel arrangements, and the like can be extensively interactive. For example, a secretary may access an appointment schedule file using a regular PC connected to the Internet, the schedule for an employee temporarily inaccessible (in the middle of the night in Moscow, for example, while the employee may be sleeping) and make adjustments in the employee's appointments. When the employee next establishes contact with the Proxy-Server, the appointment calendar in the employee's unit is compared by date and time stamp, and automatically updated as necessary, following preset rules for conflict resolution.

An advantage inherent in different embodiments of the present invention is that future improvements in HTML, specific WEB browsing applications, and helper applications need not be installed on the field units used in practicing the invention. Such improvements need only be made in the Proxy-Server. The Proxy-Server can also be updated to do the best translation possible for such improvements.

In an important aspect of the invention, Proxy-Servers adapted to embodiments of the present invention may be provided by commercial Internet providers, thereby providing their customers with extended functionality for small and inexpensive computer units, lowering the expense and complexity typically required of machines that may be expected to access the Internet. In this aspect, customers of such providers could browse the Internet and download and display sophisticated files with existing inexpensive portable computers, personal digital assistants, and digital organizers. This feature promises to dramatically increase accessibility to the Internet, and to lower barriers to entering the Internet world for many people who could otherwise not afford to do so.

Also in embodiments of the invention as incorporated in Proxy-Servers, caching is provided, whereby data downloaded from other Internet servers accessed according to commands entered by users in the field having units connected to the Proxy-Server, may be temporarily stored before or after translation for field units, enhancing viewing speed dramatically at the field units.

It is anticipated that one Proxy-Server may serve a large number of hand-held computers, giving each served computer a functionality far beyond what it could otherwise provide given its power and cost. Current estimates indicate that a single Proxy-Server may serve 100 or more field units simultaneously. Since statistically not all subscribers may be expected to be using their field units at the same time, one such Proxy-Server could serve perhaps 2000 subscribers.

Figure 5:
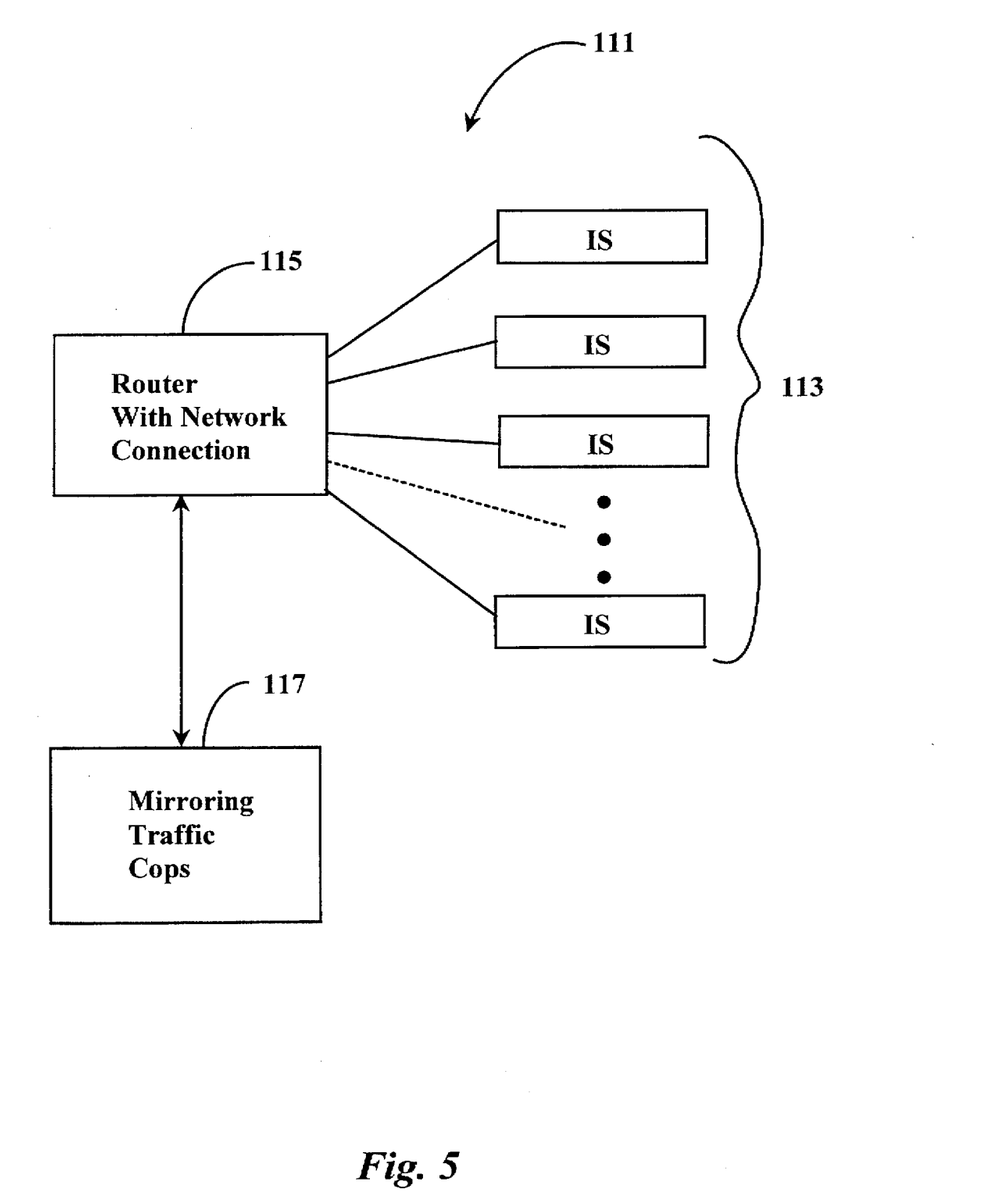
FIG. 5 is a block diagram of an Uninterrupted Matrix of Inexpensive Servers according to an embodiment of the invention.

Even though a single Proxy-Server might be expected to serve a relatively large number of subscribers at the same time, the number of potential users of such a system is very much larger than a single Proxy-Server could be expected to service. For this reason, in a preferred embodiment of the invention, an Un-interrupted Matrix of Inexpensive Servers (UMIS) is provided as a method for implementation for the Proxy Server. FIG. 5 is a block diagram of a UMIS system 111 wherein relatively small, inexpensive servers 113, each with its own hard disks, are interconnected in a network protocol with a router 115 and a mirroring traffic cop server 117. Such a system can handle massive numbers of requests, at a moderate cost, and the system and is scalable and to a high degree fail-safe.

An incoming request is directed to the traffic cop, which is a mirroring system, so that in case one unit fails, the other can take over without interruption. The traffic cop determines that availability and load of all IS's on a regular basis by connecting a requesting a load number (timeout is regarded as failure of that IS), so it can direct requests to the lowest loaded IS. If an IS fails, the traffic cop will learn of it at the next round, and can notify a system supervisor. The load is then shared between the remaining units. Also, a failure of one of the mirroring units triggers a notification to the supervisor. An escalation can be added via e-mail and pagers until proper action is taken.

Ideally the IS units are like drawers that fit into a rack, and have a red light that goes on when and if they fail. This way, service personnel can see immediately which unit needs to be exchanged.

Since there is only transitory data on hard-disks of the IS's, no data recovery is required. In case of open connections, the client's TCP/IP protocol will retry after a time out, and will be directed by the cop to a new IS, thus recovering completely transparently. This way cost per subscriber can be held very low. On the Cop units, since they are mirroring, after an exchange of a defective unit a software routine is started that reconfigures the new unit to be synchronized.

Figure 6:
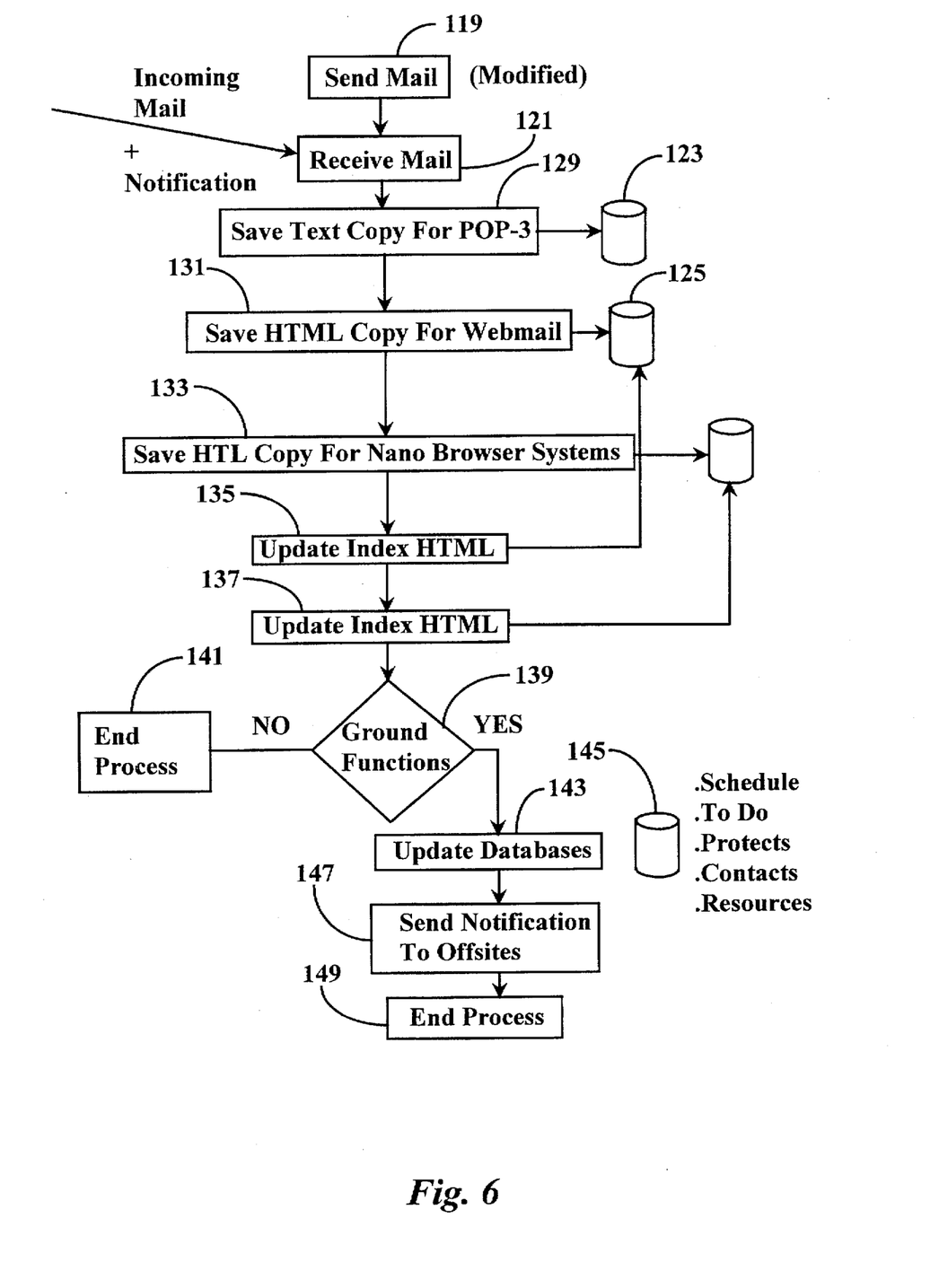
FIG. 6 is a flow diagram illustrating enhanced E-mail and groupware functions according to an embodiment of the present invention.

As was described above, in systems according to embodiments of the present invention, many database functions can be shared with entries, edits and updates made over Internet connections. In addition to database functions, systems according to embodiments of the invention can accomplish enhanced E-mail functions. FIG. 6 is a flow diagram illustrating the nature of such functionality.

The functions illustrated by the flow diagram of FIG. 6 are accomplished by executing software either on a Proxy-Server or at a separate mail server which may be accessed by a Proxy-Server according to an embodiment of the present invention. The routines depicted here are a modified version of SendMail routines known in the art.

In FIG. 6 events for purposes of description begin at step 119. Modified SendMail is active. At step 121 incoming mail is received. In this modified system, there are three file systems 123, 125, and 127 for storing E-mail in different versions. At step 129 a text copy is saved in file system 123 according to Post Office Protocol, revision 3 (POP-30 format, known in the art. At step 131 a copy of the received E-mail entity is saved in HTML format, for WEB mail. At step 133 a copy of the entity is saved in HTL format, compatible with the communication protocol for HT-Lite used between a field unit and a Proxy-Server in embodiments of the present invention.

At step 135 an HTML index is updated. At step 137 an HTL index is updated. At step 139 a discrimination is made as to whether data received is flagged to update a Group-Ware database. If not, the process ends at step 141. If so, the appropriate database is updated at step 143 in file system 145. Examples of such databases are an appointment schedule, a ToDo list, a project file, a contacts file, and resumes. There are many more databases that might be updated as well. At step 147 notification of changes in a database are sent to appropriate offsite addresses. The process ends at step 149 until another E-mail message is received.

In the manner shown, E-mail may be shared in the conventional POP 3 manner, sent as HTML with a WEB page, or sent over a TCP/IP pipe as an HT-Lite file directly to a field unit having a NanoBrowser according to the present invention. Moreover, the Internet links may be used to manipulate the scheduling and other GroupWare functions described. Also, the technology disclosed here relative to E-mail and GroupWare functions can be applied to other massive server functions; it is not limited to the Proxy-Server of the present invention.

It will be apparent to those with skill in the art that there are many variations that may be made in embodiments of the invention as described above without departing from the spirit and scope of the invention. There are, for example, a wide variety of ways different programmers might arrange code to accomplish the purposes described for the invention. Such differences in code do not necessarily constitute distinguishable variations because it is well known that the same results in function, hence method of application, may well be accomplished by a variety of code and/or system arrangements. The range of functions provided at a field unit may also vary widely in different embodiments of the invention, and there are, as described above, many sorts of computer units that will qualify as field units in cooperation with a Proxy-Server according to embodiments of the invention.

Other variations within the scope of the invention include hardware variations. There is no strict requirement for a Proxy-Server other than the requirement of executing the InterBrowser program or programs in combination with WEB browsing functions, while maintaining communication with one or more field units and one or more other WEB servers. There are similarly many other variations that will be apparent to those with skill in the art, all within the spirit and scope of the invention.

What is claimed is:

1. A computing system comprising:
   a field computer comprising a display having a specific size and resolution; and
   a Proxy-Server connected to the field computer by a data link, the Proxy-Server having an Internet port;
   wherein the Proxy-Server is adapted to access Internet servers through the Internet port directed by commands and data received from the field computer, to download data from the Internet servers thus accessed, to transpose the downloaded data by reducing information density, and to transfer the transposed data to the field computer via the data link in a TCP/IP format.

2. A computing system as in claim 1 wherein the field computer is a portable computer powered by an electrical storage cell system.

3. A computing system as in claim 2 wherein the hand-held computer operates at a maximum one-hundred-thousand instructions per second.

4. A computing system as in claim 1 wherein the Proxy-Server downloads data comprising WEB pages and transposes the data to match the specific size and resolution of the display of the field computer.

5. A computing system as in claim 1 wherein the Proxy-Server comprises a cache, and caches data downloaded from Internet servers as a step in transferring the data to the field computer.

6. A computing system as in claim 1 wherein, upon connection, the field computer transfers to the Proxy-Server information particular to specific characteristics of the field computer, and wherein the Proxy-Server incorporates the information in transposing data for transfer to the field computer.

7. A computing system as in claim 1 wherein the data link is a telephone connection with a telephone modem in the field computer.

8. An Internet Proxy-Server comprising:
   a first data port adapted for accessing other Internet servers; and
   a second data port adapted for connecting to a field computer;
   wherein the first Internet server is adapted to access the other Internet servers through the first data port, directed by commands and data received through the second data port from the field computer, to download data from the Internet servers thus accessed, to transpose the downloaded data by reducing information density, and to transfer the transposed data to the field computer via the first data link in a TCP/IP format.

9. An Internet Proxy-Server as in claim 8 wherein the first data port and the second data port are both adapted for communicating over telephone lines.

10. An Internet Proxy-Server as in claim 8 wherein the Proxy-Server downloads data comprising WEB pages and transposes the data to match specific size and resolution of a display of the field computer.

11. An Internet Proxy-Server as in claim 8 wherein the Proxy-Server is adapted to accept information particular to specific characteristics of a field computer connected at the first data port, and wherein the Proxy-Server incorporates the information accepted in transposing data for transfer to the field computer.

12. An Internet Proxy-Server as in claim 8 wherein the first and second data ports are telephone modems.

13. A method for adapting Internet files for a field computer, comprising steps of:
   (a) downloading files from the Internet to a Proxy-Server;
   (b) transposing the files by accomplishing information density reduction;
   (c) transferring the transposed files to the field computer over a data link connecting the field computer to the Proxy-Server.

14. The method of claim 13 wherein, in step (b), information specific to the connected field computer, transferred to the Proxy-Server from the filed computer over the data link connecting the field computer to the Proxy-Server, is used in transposing the files.

15. The method of claim 14 wherein the information specific to the field computer comprises display type, size and resolution.

16. A method for browsing the World Wide Web (WWW) with a first computer, comprising steps of:
   (a) sending browsing commands and data from the first computer to a second, more powerful computer via a data link connecting the first computer to the second computer;
   (b) using the browsing commands and data from the first computer to access and browse the WWW via a data port connecting the second computer to the WWW;
   (c) downloading files from the WWW via the data port to the second computer;
   (d) transposing the downloaded files in the second computer by reducing information density; and
   (e) transferring the transposed files via the data link to the first computer.

17. The method of claim 16 wherein information specific to the first computer is used in transposing the downloaded files.

* * * * *